Nov. 1, 1927.
C. McPHERSON
1,647,457
POWER TRANSMITTING DEVICE
Filed March 19, 1925
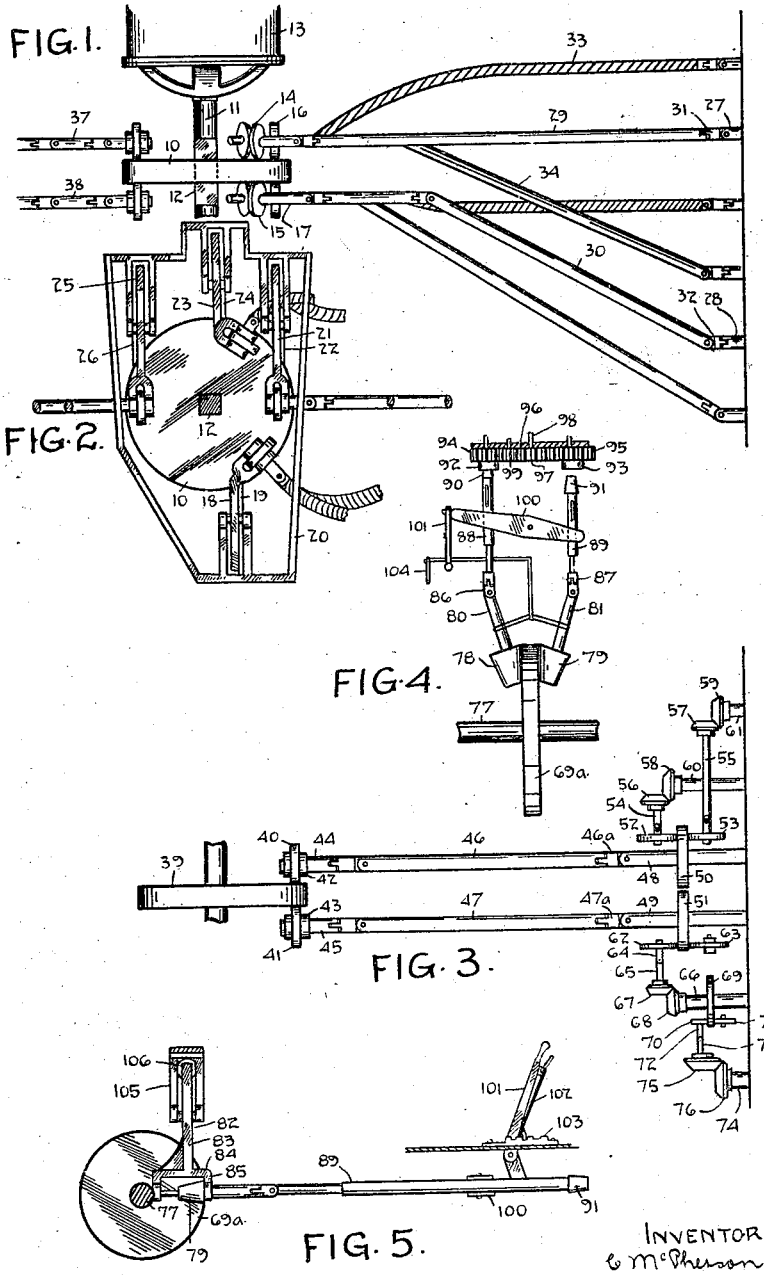
INVENTOR
C. McPherson
By E J Featherstonhaugh
ATTORNEY Patented Nov. 1, 1927.

1,647,457

UNITED STATES PATENT OFFICE.

CHARLES McPHERSON, OF MONTREAL, QUEBEC, CANADA, ASSIGNOR, BY MESNE ASSIGNMENTS, TO FRICTION POWER CORPORATION LIMITED, OF MONTREAL, QUEBEC, CANADA.

POWER-TRANSMITTING DEVICE.

Application filed March 19, 1925. Serial No. 16,769.

The invention relates to a power transmitting device as described in the present specification and illustrated in the accompanying drawings that form part of the same.

The invention consists essentially of the novel features of construction pointed out in the claim for novelty following a description in detail of an acceptable form of the invention.

The objects of the invention are to facilitate the transmission of power through a friction gearing to the machines to be driven without unnecessary losses usually due to slippage and such causes; to effect the maximum flexibility between machines; to particularly adapt the mechanism described in a copending application filed under Serial Number 735,352 on the 2nd day of September, 1924, to other specific uses not enumerated in said application; and generally to economize in the use of power and provide a simple, durable and efficient mechanism in doing so.

In the drawings Figure 1 is a diagrammatic view showing the adaption of this invention to a machine having a plurality of operating parts.

Figure 2 is a plan view of the disk and cone rollers in one of the many arrangements that can be made in drawing off a multiplicity of drives from the disk.

Figure 3 is a diagrammatic view showing a plurality of drives to a machine and a series of disks and drives throughout the machine.

Figure 4 is a plan view of the invention as applied to a motor car drive showing a preferred form of friction wheel.

Figure 5 is a side elevation of the disk showing one cone roller.

Like numerals of reference indicate corresponding parts in the various figures.

Referring to the drawings, the disk 10 is slidably mounted on the shaft 11 which is squared to form the seat 12. The shaft 11 is operated by a motor 13 which may be connected to said shaft 11 in any convenient manner according to the conditions of use.

The cone rollers 14 and 15 engaging the disk 10 on either side are mounted on the shafts 16 and 17 journalled in the rocker arms 18 and 19 and these arms are pivotally secured in a frame 20 and spring-held. The frame 20 also forms a support for the rocker arms 21 and 22, 23 and 24 and 25 and 26, each carrying its pair of cone rollers engaging the disk on either side.

The machine shafts 27 and 28 are operatively connected to the shafts 16 and 17 through the shafts 29 and 30 and universal joints 31 and 32 and other shafts in the same machine are flexibly connected by the shafts 33 and 34, and 35 and 36 to the rocker arms 21 and 22 and 23 and 24, while the cone rollers 25 and 26 may be running quite another machine, through the flexible connections 37 and 38.

In Figure 3 the main driving disk 39 is shown slidably mounted and having the cone rollers 40 and 41 similarly mounted in the rockers 42 and 43 and from these wheels 40 and 41, the shafts 44 and 45 are connected with the shafts 46 and 47 through the universal joints 48 and 49, and the shafts 44 and 45 through the universal joints 46ᵃ and 47ᵃ to the driven machine shafts 48 and 49.

This conveys the power to two principal shafts of the driving machine and on these shafts 48 and 49 the subsidiary disks 50 and 51 are mounted and slidable thereon. The cone rollers 52 and 53 engage the disk 50 and their shafts extend into the shafts 54 and 55 through flexible joints and in this application the gears 56 and 57 are shown at the ends of said shafts 54 and 55 and again these gears 56 and 57 are shown as coacting with the gears 58 and 59 at the ends of the machine shafts 60 and 61. Of course these gear connections are only shown to facilitate the explanation of the invention and may not be required at all in the disposition of the shafts and distribution of the power.

The cone rollers 62 and 63 engage the disk 51; and the shaft 64 from the roller 62 extends in a flexible connection 65 to the machine shaft 66 to which it is shown operatively connected by the gears 67 and 68.

The subsidiary disk 69ᵃ is slidably mounted on the shaft 66 and is engaged by the cone rollers 70 and 71 and the shaft 72 extends from the roller 70 in the flexible connection 73 to the machine shaft 74, to which it is shown as operatively connected by the gears 75 and 76, thus it will be seen that not only may a number of shafts extend to one or more machines through flexible connections, and be driven by the one disk, but a plurality of shafts may extend from the one disk and a series of disks arranged on successive shafts, in order to obtain a more varied distribution of the power and this is particularly useful where a minor part to a machine requires a much diminished power in comparison with the major portion of the machine.

As shown in Figures 4 and 5 the disk 69$^a$ is slidably mounted on the drive shaft 77 customarily connected to the rear wheels for propelling the vehicle. The disk 69$^a$ is held between the friction drive members 78 and 79, which are fixedly mounted on the shafts 80 and 81 journalled at the ends of the rocker arms 82 and 83 and particularly in the forks 84 and 85, said shafts being preferably slidable in their bearings.

These friction drive members 78 and 79 engage the side faces of the disk 69$^a$ and taper inwardly towards the hub of the disk, so that when the cone roller is at the extreme outer position a line drawn along its outer surface if continued will pass through the centre of the disk. The shafts 80 and 81 are connected through the universal joints 86 and 87 to the slip shafts 88 and 89 and these shafts are secured at their extremities to the tapered clutch ends 90 and 91 which are adapted to engage in the tapered cups 92 and 93 from the gears 94 and 95.

The gears 94 and 95 are mounted in the clutch frame 96, also the gear 97 on the shaft 98 and the intermediate gear 99, said gear 95 driving the gear 94 directly and the gear 97 through the intermediate gear 99. Thus on bringing the clutch end 90 into engagement with the tapered cup 92 the engine shaft 98 will be connected throughout the cone roller driving member 78, for the rearward or reverse movement of the vehicle as the roller is on the opposite side of the disk.

Any suitable form of mechanism may be used for operating the clutch members and in this connection a pivoted arm 100 is shown as operated by a lever 101, said arm engaging the shafts towards the clutch ends 90 and 91 the lever having a suitable latch 102 operating in the toothed rack 103.

The lever 104 is connected through suitable rod connections to the shafts 80 and 81 for operating the speed control as the shifting of the cone driving rollers on the disk 69 constitutes the control of the speed which may be regulated to meet the demands of the driver in actual practice, thereby obviating the necessity of changing gears and providing an excellent service brake when the shafts 80 and 81 are in neutral position and further eliminating the expensive clutch mechanism required under present conditions.

The rocker arms 82 and 83 are pivoted intermediate of their length in the bracket 105 secured and rigidly held from the frame of the vehicle and the spring 106 spreads these arms.

It will be seen that a motor vehicle can be safely and efficiently propelled through this transmission and as much pressure put on the disks as may be found desirable without bringing the objectionable end thrust so common to friction drives.

What I claim is:—

In a power transmitting device, rocker arms in pairs, pivot bearing members forming mountings for said rocker arms, a plurality of pairs of friction rollers journalled fixedly in bearings forming parts of said rocker arms, a disk introduced between said rollers and coacting therewith, a rotatable mounting for said disk, springs maintaining said rollers in close engagement with said disk, a plurality of pairs of extension shafts forming flexible connections from said roller shafts, a plurality of machine shafts, flexibly connected to said extension shafts, a gear support forming a slidable way accounting for the self adjusting movements of the rocker arms cooperating with said spring held rocker arms in maintaining the engagement of the rollers and adapted to hold a cooperating gear in movable relationship with the other notwithstanding the varying positions taken respectively by the coacting gears in following their independent supports.

Signed at Montreal, Canada, this 28th day of February, 1925.

CHARLES McPHERSON.